United States Patent
Hildner et al.

(10) Patent No.: US 7,204,035 B2
(45) Date of Patent: Apr. 17, 2007

(54) DISPLACEMENT MEASURING SYSTEM FOR A PISTON-CYLINDER ASSEMBLY

(75) Inventors: Stefan Hildner, Ludwigschorgast (DE); Achim Thoma, Bergrheinfeld (DE); Wolfgang Kolb, Werneck (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 18 days.

(21) Appl. No.: 10/920,742

(22) Filed: Aug. 18, 2004

(65) Prior Publication Data

US 2005/0066536 A1    Mar. 31, 2005

(30) Foreign Application Priority Data

Sep. 27, 2003 (DE) .................. 103 44 952

(51) Int. Cl.
*G01D 21/00* (2006.01)
*F01B 31/12* (2006.01)

(52) U.S. Cl. .................. 33/706; 33/603; 92/5 R; 91/1

(58) Field of Classification Search .................. 33/706, 33/707, 708, 600, 603, 604, 605; 91/1; 92/5 R; 324/207.22, 207.23, 207.24, 207.25, 324/207.26
See application file for complete search history.

(56) References Cited

U.S. PATENT DOCUMENTS

| | | | |
|---|---|---|---|
| 2,930,360 A * | 3/1960 | Stephen | 91/385 |
| 4,086,456 A | 4/1978 | Bone | |
| 4,471,304 A | 9/1984 | Wolf | |
| 4,756,229 A * | 7/1988 | Drakeley | 91/1 |
| 4,757,750 A * | 7/1988 | Stoll | 92/165 R |
| 4,838,146 A | 6/1989 | Stoll | |
| 4,854,218 A * | 8/1989 | Stoll | 91/1 |
| 4,902,178 A | 2/1990 | Neyret | |
| 5,009,450 A * | 4/1991 | Herberg et al. | 188/266.1 |
| 5,103,172 A * | 4/1992 | Stoll | 324/226 |
| 5,246,247 A * | 9/1993 | Runkel | 280/5.503 |
| 5,299,489 A * | 4/1994 | Obrecht et al. | 92/5 R |
| 5,351,599 A | 10/1994 | Stoll | |
| 5,979,069 A * | 11/1999 | Hayashida et al. | 33/556 |
| 6,007,034 A * | 12/1999 | Stoll et al. | 248/229.1 |
| 6,637,279 B2 | 10/2003 | Kroll et al. | |
| 6,707,290 B2 * | 3/2004 | Nyce et al. | 324/207.13 |

(Continued)

FOREIGN PATENT DOCUMENTS

DE    29 45 895 A1    5/1981

(Continued)

OTHER PUBLICATIONS

Search Report dated Aug. 9, 2006 issued for the corresponding European Application No. 04 02 2641.

*Primary Examiner*—Diego Gutierrez
*Assistant Examiner*—Amy R. Cohen
(74) *Attorney, Agent, or Firm*—Cohen Pontani Lieberman & Pavane LLP

(57) ABSTRACT

A piston rod is guided with freedom of axial movement in a cylinder, where the position of the piston rod is detected by a first position-measuring device, which travels along with the piston rod, and by a second position-measuring device on the cylinder side. The two position-measuring devices are radially adjacent and axially parallel, and are supported in such a way that they cannot rotate with respect to each other.

6 Claims, 2 Drawing Sheets

U.S. PATENT DOCUMENTS

| | | | |
|---|---|---|---|
| 6,812,693 B2 * | 11/2004 | Heinrich et al. | 324/207.15 |
| 6,823,725 B2 * | 11/2004 | Lohberg | 73/116 |
| 6,825,656 B2 * | 11/2004 | Hanisch | 324/207.2 |
| 6,941,827 B2 * | 9/2005 | Krone et al. | 73/865.9 |
| 7,051,639 B2 * | 5/2006 | Krone et al. | 91/1 |
| 2004/0226183 A1 * | 11/2004 | Sielemann | 33/708 |

FOREIGN PATENT DOCUMENTS

| | | |
|---|---|---|
| DE | 36 43 290 C2 | 12/1986 |
| DE | 34 20 666 C2 | 5/1993 |
| DE | 38 26 184 C2 | 6/1993 |
| DE | 94 12 435.3 | 10/1994 |
| DE | 298 16 156 U1 | 1/1999 |
| DE | 298 18 823 U1 | 2/1999 |
| DE | 41 16 651 C2 | 1/2000 |
| DE | 202 18 754 U1 | 8/2003 |
| WO | WO 01/94796 | 12/2001 |

* cited by examiner

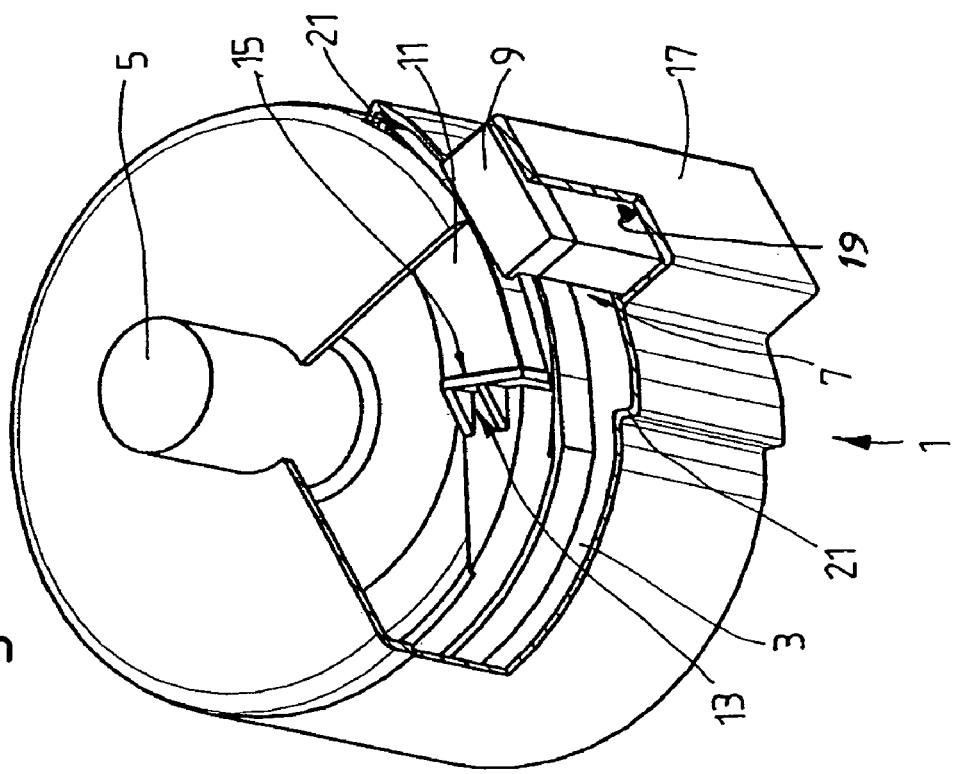
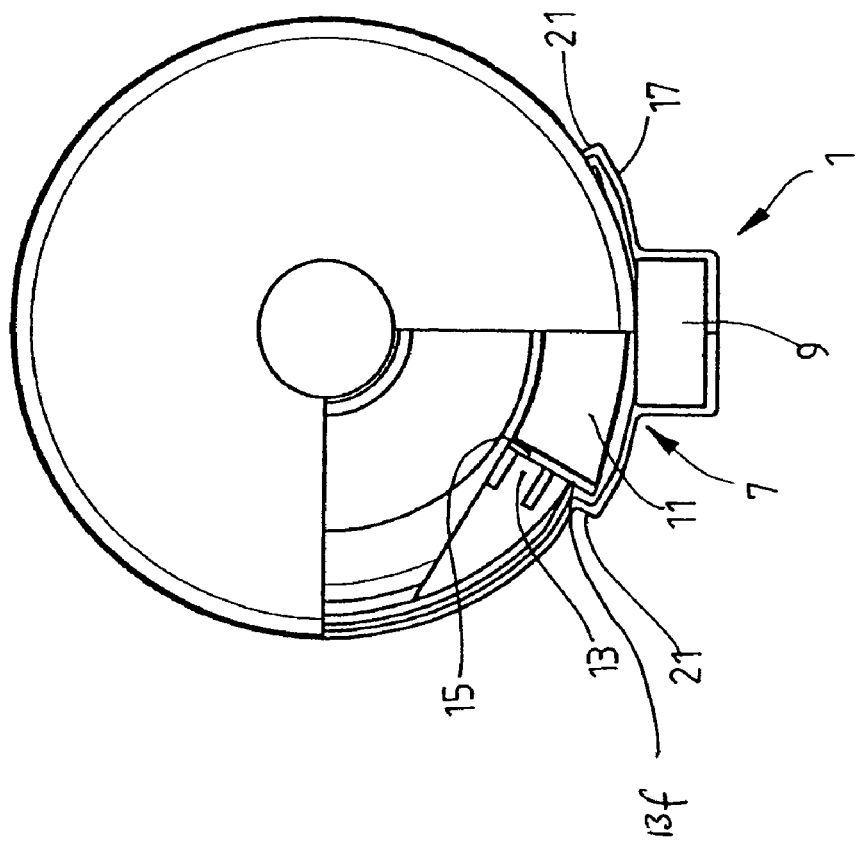

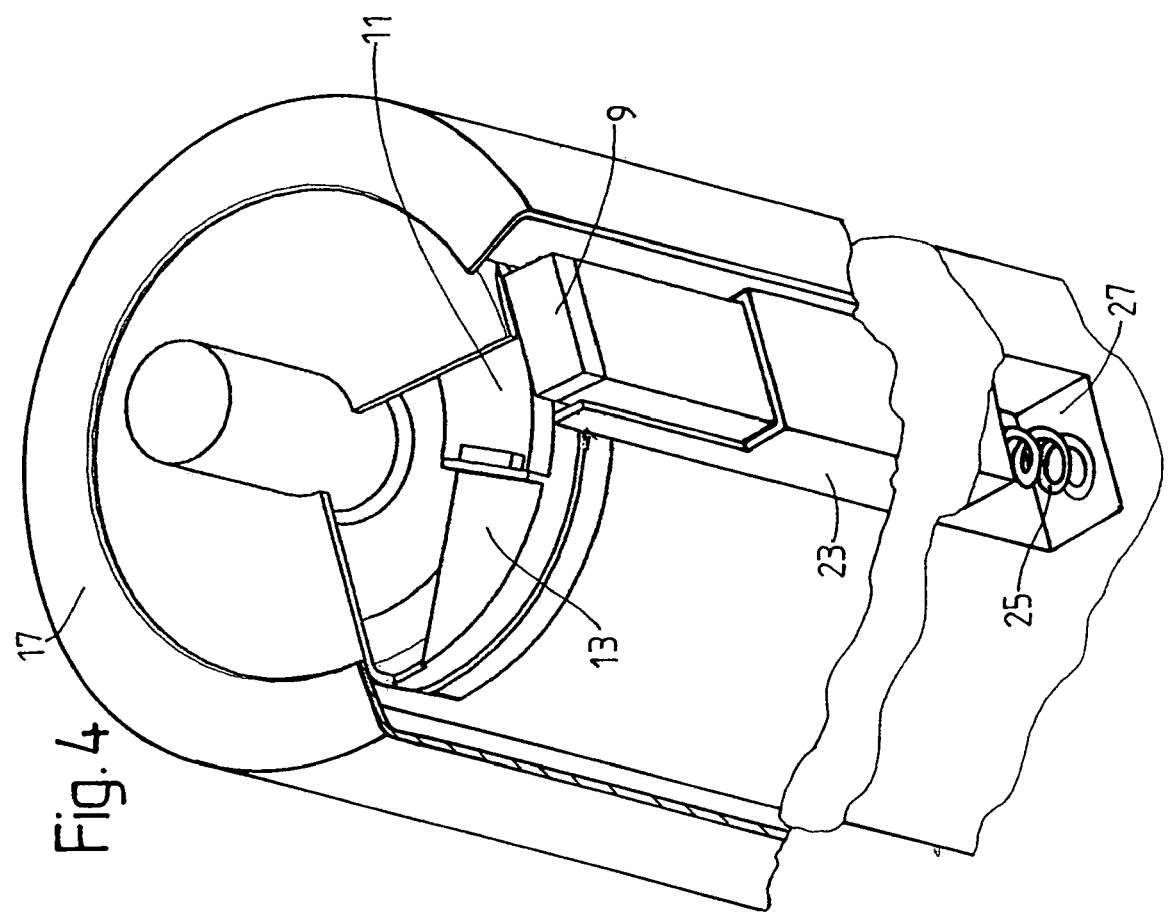
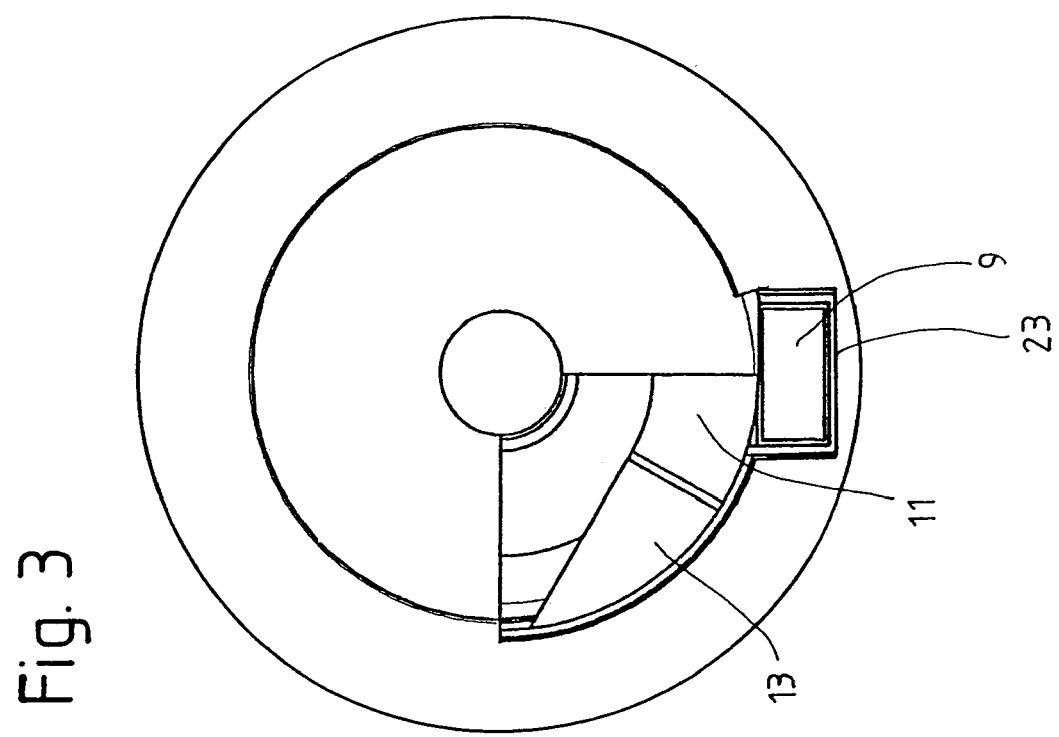

DISPLACEMENT MEASURING SYSTEM FOR A PISTON-CYLINDER ASSEMBLY

BACKGROUND OF THE INVENTION

1. Field of the Invention

The invention pertains to a displacement measuring system for a piston-cylinder assembly including a cylinder, a piston rod guided for movement axially within the cylinder, a first position measuring device which moves with the piston rod, and a second position measuring device fixed to the cylinder.

2. Description of the Related Art

A sensor for a piston-cylinder assembly is known from DE 29 45 895 A1. The sensor is located inside a piston rod guide so that it can detect the stroke position of the piston-cylinder assembly at any specific moment. A general problem is that the piston rod can twist during operation. The only remedy here is either a piston rod which is "prepared" around its entire circumference or a sensor in the form of a circular ring.

DE 94 12 435 U1 describes a working cylinder, which has a piston rod with a magnetic strip inside it. The piston rod also has a rectangular, preferably square, cross section and cooperates with a corresponding square piston rod guide. The rod is thus prevented from twisting, which makes it possible to use a combination of a comparatively narrow magnetic strip and a sensor with a narrow measuring field, but the sealing of a square rod represents a much more difficult problem than the sealing of a uniformly round piston rod, especially when the square rod is to be installed in a mass-produced product and corresponding standard components and tools are to be used.

SUMMARY OF THE INVENTION

The task of the present invention is to realize a displacement measuring system on a piston-cylinder assembly, where a round piston rod can be used and where the displacement measuring system is limited in the circumferential direction.

The task is accomplished in accordance with the invention by locating the first position-measuring device outside and axially parallel to the piston rod, this position-measuring device being guided on the cylinder side with respect to the second position-measuring device.

The great advantages of the invention are that, first, a round piston rod guide, which can be sealed relatively easily, can be used, and, second, that the displacement measuring system is secured against twisting.

It is also provided that the position-measuring device on the cylinder side, i.e., the second device, is mounted in a holder, which has guide surfaces for the first position-measuring device, which is on the piston rod side. The holder can be attached to a conventional piston-cylinder assembly, e.g., to a vibration damper, without the need for any changes to the internal design of the assembly.

According to a preferred embodiment, the holder guides the first position-measuring device radially and in the circumferential direction. Depending on the point of attachment of the second device to the piston-cylinder, only axial forces are introduced to the first position-measuring device. The first position-measuring device does not fulfill a guide function. The guide function lies solely with the holder.

In a further advantageous embodiment, the piston rod is enclosed by a protective sleeve, which drives the position-measuring device on the piston rod side. The protective sleeve which is normally present at least in the case of a vibration damper can be used.

In a variant, the position-measuring device on the piston rod side is carried by the protective sleeve. For this purpose, the protective sleeve can have a receiving channel for the piston rod-side position-measuring device.

The displacement measuring system can also be designed in such a way that the piston rod-side position-measuring device is axially pretensioned against the protective sleeve by a spring on the cylinder side. To ensure satisfactory function, the protective sleeve can turn with respect to the first and second position-measuring devices, because these are guided by the holder.

Alternatively, the protective sleeve can be provided with anti-rotation guide surfaces, which are supported on the cylinder. So that the cylinder can have the simplest possible geometry, the protective sleeve is supported in the circumferential direction on the holder for the cylinder-side position-measuring device.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 1 is a cutaway perspective view of a piston-cylinder assembly with a position-measuring device inside a protective view;

FIG. 2 is a plan view corresponding to FIG. 1;

FIG. 3 is a cutaway plan view of a piston-cylinder assembly with a position-measuring device guided completely inside a holder; and FIG. 4 is a perspective view corresponding to FIG. 3.

DETAILED DESCRIPTION OF THE PRESENTLY PREFERRED EMBODIMENTS

FIG. 1 shows a partial perspective view of a piston-cylinder assembly 1, in particular a vibration damper. Inside a cylinder 3, a piston rod 5 is guided with freedom of axial movement; the piston rod has a cross section which is circular within the scope of manufacturing tolerances. The piston-cylinder assembly is installed, for example, in a chassis, where it is important with respect to the adjustment of the chassis to determine the stroke position of the piston rod with respect to the cylinder. For this reason, a displacement measuring system 7 is used, which has a first position-measuring device 9, which moves along with the piston rod. This first device works in combination with a second position-measuring device 11, which is in on the cylinder side. The two position-measuring devices 9, 11 are located outside of and axially parallel to the piston rod, and they are guided with respect to each other.

The cylinder-side position-measuring device 11 is located inside a holder 13, which, for example, is attached by a clamp to the cylinder 3. The holder has a receptacle 15 for the cylinder-side position-measuring device 11. The concrete technical design of the position-measuring device is not essential to the invention, because there are several different technical embodiments which could be used.

The cylinder 3 is enclosed by a protective sleeve 17, which also drives the piston rod-side position-measuring device 9, because the protective sleeve 17 and the piston rod 5 are at least indirectly connected to each other. In this variant, the piston rod-side position-measuring device 9 is carried by the protective sleeve 17. For this purpose, the protective sleeve has a receiving channel 19 for the position-measuring device 9. In addition, the protective sleeve 17 is provided with anti-rotation guide surfaces 21, which are supported on the cylinder side. In concrete terms, the protective sleeve 17 is supported in the circumferential direction against the guide surfaces 13f of the holder 13.

In the alternative variant according to FIGS. 3 and 4, the limits of the system have been changed in comparison to FIGS. 1 and 2. The piston rod-side or first position-measuring device 9 is bordered radially and in the circumferential direction only by the holder 13. For this purpose, the holder 13 has a receiving channel 23, in which the first position-measuring device 9 can be pushed by the protective sleeve 17 by simple end-surface contact. The first position-measuring device 9 can be permanently connected axially to the protective sleeve 17, or a spring 25 can be inserted, which is axially supported against the holder 13, e.g., against the bottom 27 of the guide channel 23, and which loads the first position-measuring device axially against the protective sleeve 17. In the latter case, the protective sleeve 17 can be installed in any circumferential position with respect to the first position-measuring device 9.

During the assembly process, the holder 13 with the second position-measuring device 11 is clamped onto the cylinder 3. In parallel with this, the first position-measuring device 9 can be pushed into the receiving channel 23 of the protective sleeve 17. Then the protective sleeve 17 is threaded onto the piston rod. When used, e.g., in the previously mentioned chassis, the protective sleeve 17 is fixed in position axially with respect to the piston rod 5. Because of the anti-rotation function present between the two position-measuring devices 9, 11 inside the holder 13, the size of these devices can be limited to a comparatively small circumferential angle. As a result, the amount of space required for them is decreased, and production costs are reduced.

The invention is not limited by the embodiments described above which are presented as examples only but can be modified in various ways within the scope of protection defined by the appended patent claims.

We claim:

1. A displacement measuring system for a piston-cylinder assembly, the system comprising:
   a cylinder;
   a piston rod guided for movement axially within the cylinder;
   a first position measuring device which moves with the piston rod and is fixed against circumferential movement with respect to the cylinder;
   a second position measuring device fixed to the cylinder radially adjacent and axially parallel to the first position measuring device, the first and second positioning measuring devices being fixed against circumferential movement with respect to each other;
   a protective sleeve which surrounds the cylinder and moves with the piston rod, the first position measuring device being arranged inside the sleeve and moving with the sleeve;
   a spring which axially loads the first position measuring device against the sleeve; and
   a holder for the second position measuring device, the holder having a receiving channel in which the spring and the first position measuring device are received, the first position measuring device being axially moveable in the channel.

2. A displacement measuring system as in claim 1 wherein the holder has guide surfaces which prevent circumferential movement of the first position measuring device relative to the second position measuring device.

3. A displacement measuring system as in claim 1 wherein the first position measuring device is fixed to the sleeve.

4. A displacement measuring device as in claim 3 wherein the sleeve has a receiving channel in which the first position measuring device is fixed.

5. A displacement measuring system as in claim 4 wherein the sleeve has anti-rotation surfaces which prevent circumferential movement of the sleeve with respect to the cylinder.

6. A displacement measuring system as in claim 5 wherein the holder has guide surfaces which cooperate with the anti-rotation surfaces on the sleeve to prevent circumferential movement of the first position measuring device relative to the second position measuring device.

* * * * *